P. Youngs,
Circular Saw Mill.
N° 12,337.        Patented Jan. 30, 1855.
Fig. 1.
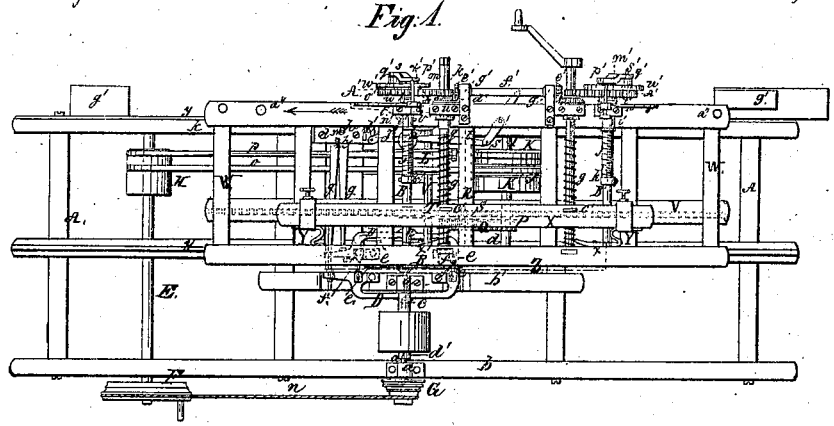
Fig. 3.
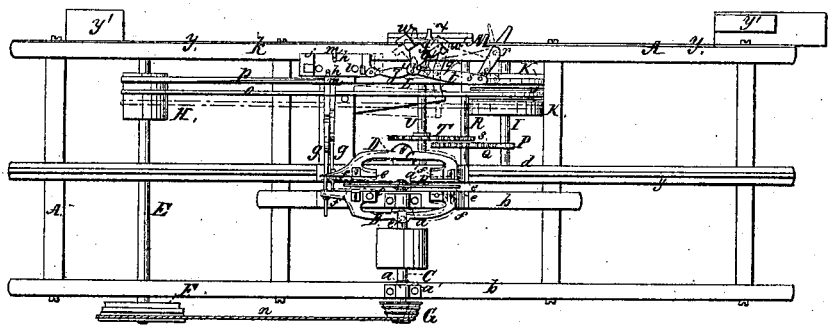
Fig. 5.    Fig. 6.    Fig. 4.
  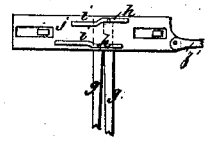  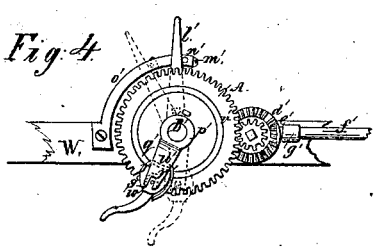
Fig. 2.
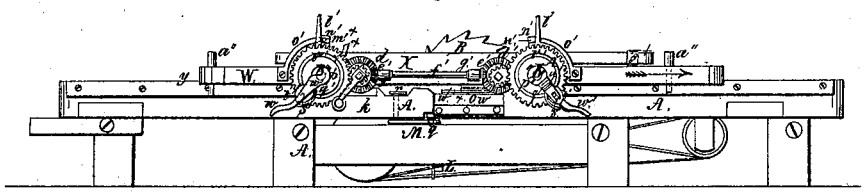

UNITED STATES PATENT OFFICE.

PINNEY YOUNGS, OF MILWAUKEE, WISCONSIN.

SAWING-MACHINE.

Specification forming part of Letters Patent No. 12,337, dated January 30, 1855; Reissued October 2, 1855, No. 330.

*To all whom it may concern:*

Be it known that I, PINNEY YOUNGS, of Milwaukee, in the county of Milwaukee and State of Wisconsin, have invented a new and Improved Sawing-Machine; and I do hereby declare that the following is a full, clear, and exact description of the same, reference being had to the annexed drawings, making a part of this specification, in which—

Figure 1, is a plan or top view of my improved machine. Fig. 2, is a side view of do. Fig. 3, is a plan or top view of do., the carriage on which the log or timber to be sawed is placed or secured, being removed. Fig. 4, is a detached view of one of the toothed wheels, pinions, levers or arms, and clutch by which the log or timber is properly set to the saw. Fig. 5, is a detached view of one of the clutches which act upon the toothed wheels. This is a view of the inner face or surface of the clutch. Fig. 6, is a detached view of the sliding plate by which the saw guides are operated.

Similar letters of reference indicate corresponding parts in the several figures.

This invention relates to a new and improved machine for sawing timber or boards direct from the log, or for resawing timber, and consists:—1st. In the employment or use of saw guides, two pairs, arranged upon or attached to vibrating levers, one pair at each end, so that the guides may be brought in contact with the saw (which is circular), at either end, and so operating that when one pair of guides is brought in contact with the sides of the saw, the guides at the opposite ends of the levers will be thrown out from the saw. By this device or arrangement the saw is enabled to cut at both ends, or during both movements of the carriage, and properly guided at all times, as will be hereafter fully shown and described.

2d. My invention consists in a combination of parts forming a device for properly setting the timber or logs to the saw.

To enable others skilled in the art to make and use my invention, I will proceed to describe its construction and operation.

A, Figs. 1, 2, and 3, represents a frame work constructed in any proper manner to support the working parts.

B, Figs. 1, 2, and 3, is a circular saw hung upon a shaft C, which works in suitable bearings $(a),(a)$, on two top sills or beams $(b),(b')$, of the frame work A, as shown in Figs. 1 and 3. The shaft C, is provided with journals $(a')$ somewhat longer than the breadth of the bearings $(a), (a)$, to give the shaft C, a certain degree of play, and thus allow the saw a lateral movement so that it may conform to any moderate deviation from a straight cut and prevent bending or an undue bearing against the sides of the saw kerf.

D, D, are levers secured at their centers by pivots $(c)$, to top sides $(b')$, $(d)$, of the frame work A, a lever being at each side of the saw, as shown in Figs. 1 and 3. The ends of these levers are curved or bent toward the saw, and each lever is provided at both ends with a guide, which is merely a pin $(e)$, made of wood or other suitable material, the pin passing horizontally through an upright projection $(f)$, on the lever. It will be seen therefore, that there are two guides at each end of the saw, the saw being between them. At one end of the levers D, D, are attached rods $(g)$, $(g)$, one to each lever, see Figs. 1 and 3, and the outer ends of these rods have pins $(h)$, $(h)$, upon them, which fit in curved slots $(i)$, $(i)$, in a sliding plate $(j)$, which works on one of the top sills $(k)$, of the frame work A. The sliding plate $(j)$, is shown more particularly in Fig. 6, in Figs. 1 and 3; it is mostly covered by a top plate $(l)$, which is provided with guide slots $(m)$, $(m)$, in which the upper ends of the pins $(h)$, $(h)$, fit.

E, is a shaft at one end of the frame work A. This shaft has a cone of pulleys F, at one end, around which a belt $(n)$, passes, said belt also passing around a cone of pulleys G, at one end of the saw shaft C, see Figs. 1 and 2. The shaft E, has also a drum H, upon it, around which two belts $(o)$, $(p)$, pass, one of said belts $(p)$, being a cross belt.

I, is a shaft running in suitable bearings in the frame work, said shaft I, having a fast or working pulley J, upon it, and two idle or loose pulleys K, K, one at each side of the pulley J. The belts $(o)$, $(p)$, above mentioned, work alternately over the fast and loose pulleys on the shaft I. This will be more particularly referred to hereafter.

L, is a belt shipper which is connected by a link $(q)$, to one end of a lever M, the opposite end of the lever M, being attached to an upright rod N, which passes through the sill (k), the upright is clearly shown by dotted lines in Fig. 2.

On the upper end of the upright rod N, there is a lever (r), the outer end of which is secured by a pivot (s), to one end of an arm (t), the opposite end of said arm being attached by a pivot (u), to a button O, which is secured by a pivot (v), to the upper surface of the sill (k), see more particularly Figs. 1 and 3. The sliding plate (j), is also connected to button O, by an arm (z'), through which the point (u), also passes.

The outer end of the button O, is provided with prongs or projections (w), (w), between which a slide (x), works, see Figs. 1, 2, and 3. The outer end of the slide (x), projects some distance beyond the sill (k).

On the shaft I, on which the fast and loose pulleys J, K, K, are placed, is hung a pinion P, which gears into a toothed wheel Q, on a shaft R, said shaft R, also having a pinion S, upon it which pinion gears into a toothed wheel T, on a shaft U. The toothed wheel T, gears into a rack V, which is on the under side of a carriage W, said carriage running on ways (y), (y), on the upper surfaces of the sills (d), (k). The carriage is shown in Figs. 1 and 2, but omitted in Fig. 3. The rack V, is shown by dotted lines in Fig. 1.

On the carriage W, are placed two screw shafts (z), (z), cut with threads reverse to each other, and having nuts (c'), on them, which pass into or are attached to a bar X, on the carriage, said bar X, being provided with dogs Y, Y, one at each end, between which the timber or log to be sawed is firmly held. The timber or log is shown by red lines in Fig. 1 and designated by Z.

On the outer ends of the screw shafts (z), (z), are hung beveled wheels (d'), (d'), one on each, said beveled wheels gear into beveled pinions (e'), (e'), one at each end of a shaft (f'), which works in suitable bearings (g'), attached to the side piece of the carriage W, see Figs. 1, 2, and 3. There are also on the outer ends of the screw shafts (z), (z), small pinions (h'), (h'), which gear into toothed wheels A', A', placed loosely on shafts B', B', on the carriage W. The shafts B', B', work in suitable bearings (i'), (i'), on the carriage, and are so arranged as to allow a lateral movement or vibration. Each shaft B', has a spiral spring (j'), around it which is confined between a stop (k'), on the shaft, and the outer side piece of the carriage, as shown in Fig. 1.

On the outer end of each shaft B', and between the outer surface of the side piece of the carriage and the toothed wheel A', there is secured a lever or arm (l). The upper ends of these arms bear against pins (m') (m'), which are attached to slides (n'), (n'), which work on segments (o'), (o'), attached to the outer side piece of the carriage W, shown more particularly in Figs. 2 and 4. The spiral springs (j'), (j'), keep the arms or levers (l'), (l'), against the pins (m'), (m').

On the extreme end of each shaft B', there is secured a collar (p'), having an arm (q'), provided with a slot (r'), at its lower end, see Figs. 2 and 4, in which slot (r'), a pin (s'), attached to the outer surface of a small plate (t'), fits; this plate (t'), has a projection (u'), on its inner face which fits over a circular ledge or projection (v'), on the outer face of the toothed wheel A', and directly below the projection (u'), there is a pall (w'), the upper end or corner of which bears against the outer edge of the ledge or projection (v'), on the toothed wheel, when said pawl (w'), is pressed in the proper direction, as will be presently shown.

A small lever (x'), is attached to the inner end of each shaft B', as shown in Fig. 1, the use of which levers will be shown hereafter.

On the outer surface of the sill piece (k), there are two stops (y'), (y'), one at each end; the use of them will be presently shown.

Operation. The log or timber Z, to be sawed, is firmly secured between the dogs Y, Y, on the bar X, and motion is given to the saw shaft C; the saw B, and shaft E, are made to rotate, and the carriage W, moves in the direction indicated by the arrow, see Figs. 1 and 2, the belt (o), being over the fast or working pulley J, on the shaft I, and driving the carriage while moving in the direction as above indicated. When the log or timber Z, has passed the saw B, the lower end of the pawl (w'), strikes against the stop (y'), and the upper end of said pawl clutches the ledge or projection (v'), on the face of the toothed wheel A, which is consequently turned, as is also the opposite wheel A', in consequence of the connection formed between them by the shaft (f'), and gearing (d'), (e'), (h'). The screw shafts (z), (z), are also turned, and the bar X, and log or timber Z, is moved or set to the saw, at a distance corresponding to the distance the toothed wheels A', A', were moved. A pin (a''), in the carriage, now acts against the slide (x), and the belt shipper L, is moved, and the belt (o), is thrown off the working or fast pulley J, and on one of the loose pulleys K, the cross belt (p), being at the same time thrown on the fast or working pulley J, and the movement of the carriage is reversed. The slide (x) when moved, acts against the button O, and the belt shipper being connected to the button, is operated accordingly. The position of the rods (g), (g), is also changed at the same movement as the sliding plate ($j$), is connected to the button by the arm ($z'$), and the levers D, D, are shifted or changed, and the guides which were previously in contact with the saw, are thrown out from it, and the opposite pair brought in contact with it at its opposite end, one pair of guides being at all times against the cutting edge of the saw.

To prevent the dogs Y, Y, from coming in contact with the saw, the levers ($x'$), ($x'$), are attached to the shafts B′, B′, so that the bar X, will act against them and force outward the shafts B′, B′, and throw the pawls ($w'$), ($w'$), beyond the stops ($y'$), ($y'$). By this precaution, the bar is prevented from being set too close to the saw, and the attendant then "gigs" back the bar by turning one of the screw shafts ($z$), with the aid of a crank.

By the above invention, the saw is made to cut while the carriage is moving in either direction, no time is lost by the return movement of the carriage, as in ordinary mills. The whole apparatus or device is also self-acting, the log or timber being set to the saw, and the motion of the carriage reversed without any extraneous aid or power being applied. The guides are also operated simultaneously with the belt shipper so that a pair of guides is always in contact with the cutting edge of the saw when cutting at either end. The log or timber may also be set at any required distance toward the saw, so as to saw stuff of any required thickness, by merely altering the position of the slides ($n'$), on the segments, which will cause the pawls ($w'$), ($w'$), to be adjusted so as to be moved a greater or less distance while acted upon by the stops ($y'$), ($y'$), and consequently the toothed wheels A′, A′, will be moved around correspondingly a greater or less distance.

Having thus described my invention, what I claim as new, and desire to secure by Letters Patent, is:—

1. The employment or use of two pairs of guides ($e$), ($e$), secured to the ends of levers D, D, and arranged as herein shown, or in an equivalent way, so that said levers will be operated by the movement of the carriage, and each pair of guides brought alternately in contact with the saw near its cutting edge the levers D, D, being operated simultaneously with the reversing movement of the carriage, for the purpose of allowing the saw to be properly guided or stayed while cutting in either direction as herein set forth.

2. I claim the combination of the toothed wheels A′, A′, arms or levers ($l'$), ($l'$), ($q'$), ($q'$); and pawls ($w'$), ($w'$); attached to plates ($t'$), ($t'$); the arms ($q'$); plates ($t'$); and pawls ($w'$) forming a cultch and so arranged as to operate the wheels A′, and rotate the screw shafts ($z$), as herein shown and described, for the purpose of properly setting the log or timber to the saw. The movement of the wheels A′, being regulated by adjusting the pins ($n'$), on the segments ($o'$), or in an equivalent way, so as to give the required set to the log or timber.

PINNEY YOUNGS.

Witnesses:
   T. D. BUTLER,
   G. H. BUTLER.

[FIRST PRINTED 1913.]